April 14, 1931. H. B. MORROW 1,800,897
OIL FEED CUP
Filed Oct. 31, 1927

INVENTOR.
Howard B. Morrow
BY
ATTORNEY.

Patented Apr. 14, 1931

1,800,897

UNITED STATES PATENT OFFICE

HOWARD B. MORROW, OF LA PORTE, INDIANA

OIL-FEED CUP

Application filed October 31, 1927. Serial No. 230,076.

The invention relates to oil feed cups, and has for its object to provide an article of this character provided with means for filtering the oil passing therethrough, and which filtering means may easily be installed in a conventional sight feed oil cup to prevent dust, dirt and other foreign matter from passing through the oil cup and into the bearings of the machine to be lubricated thereby.

A further object is to provide an article of this character in which the filter element may be constructed in a separate detachable unit for use in connection with conventional oil cups already in use, and which may be easily and quickly applied, or removed for cleaning and replacement of parts.

A further object is to provide in an article of this character a filtering element provided with a protective plate which will prevent accidental puncture of the filter element by the spout of an oil can when the spout is inserted through the filler opening of the cup to fill the same.

With the above and other objects in view, the invention resides in the combination and arrangement of parts as hereinafter set forth, shown in the drawing, described and claimed, it being understood that changes in the precise embodiment of the invention may be made within the scope of what is claimed without departing from the spirit of the invention.

Figure 1:
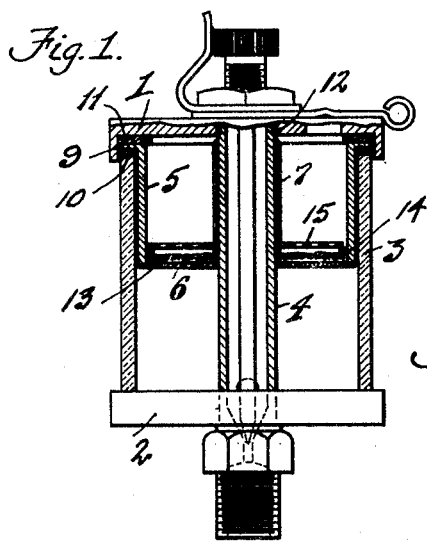
Figure 1 is a side view of a conventional sight feed oil cup shown partly in section, and having installed therein the oil filter in its preferred form shown in section.

Referring to the drawing, the numeral 1 designates the cap member, 2 the base member, 3 the cylindrical glass sides, and 4 the axially disposed tube of a conventional form of sight feed oil cup having screw threaded connections with the base and cap members for holding said parts together. Extending through the cap and tube is the usual adjustable needle valve cooperating with the discharge aperture in the base of the cup, and operating to control the discharge of oil from the cup, all for the purpose and in the manner well understood in the art.

In the preferred form of the filter unit which is designed to be easily attachable to and detachable from an oil cup of the general character described, the same comprises a cylindrical body member 5 provided with a screen 6 forming the bottom thereof, and which bottom carries an upwardly extending tubular member 7, with which an aperture 8 in the bottom member coincides and which aperture and tube permit the holder to be positioned within the cup with the tube 4 of the cup extending therethrough. The holder is further provided at its upper edge with a laterally and outwardly extending flange 9 adapted to rest upon the upper edge of the glass cylinder 3 of the cup, which thus supports the filter unit dependent within the cup. As shown, a packing ring 10 may be interposed between the flange 9 and the upper edge of the glass cylinder, and another packing ring 11 between said flange and the cap member 1, whereby a tight joint may be effected between said parts when the cap is firmly drawn to place. The cap is drawn to place by its threaded connection 12 with the tube 4, as in the conventional manner, so that by turning the cap the same will be drawn downwardly to effect a tight joint between the holder flange 9 and the cylinder edge. Disposed upon the screen bottom 6 of the holder is a centrally apertured disk 13 of filtering material which preferably consists of closely woven felt having a bottom portion more or less closely woven and the upper portion provided with an impregnated long combed nap through which very minute foreign matter will not pass, but which does not interfere with the percolation of the oil therethrough. The filtering disk 13 is held to place by means of a split flexible ring 14, which is held by tension against the holder wall and engages the marginal edge of the filter disk, thus holding the disk to place. Disposed upon the filter disk is a metal perforated disk 15, the function of which is to prevent the filter disk from becoming accidentally punctured, as when the spout of an oil can is inserted into the oil cup too far for supplying oil to the cup, in which case, but for the protective disk noted, the filter disk might be punctured and rendered ineffectual for its purpose.

It will be seen from the foregoing that I have provided a filtering unit for oil cups which may be manufactured and sold for ready application to oil cups of conventional form of which there are immense numbers already in use, thus avoiding the necessity of discarding such oil cups in order to obtain the benefit of oil filtration afforded by the filtering unit. Moreover it will be seen that the filtering unit as constructed may be easily and quickly removed from the oil cup, and a new filtering disk supplied, by simply removing the protective disk 15 and the split ring 14, when the filter disk will be accessible for removal for cleaning or replacement. Obviously the filter unit may be applied to oil cups of various makes by simply making slight dimensional changes to fit varying sizes of cups. It will also be noted that the filter unit divides the oil cup into an upper and lower chamber, so that in the case of an oil cup having a glass cylindrical side wall, the unfiltered oil supply in the upper chamber and the filtered oil in the bottom chamber may be observed, and from such observations noted if the filter element has accumulated foreign matter to an extent affecting the required rate of percolation therethrough, whereupon the filter element is removed for replacement or cleaning.

Figure 6:
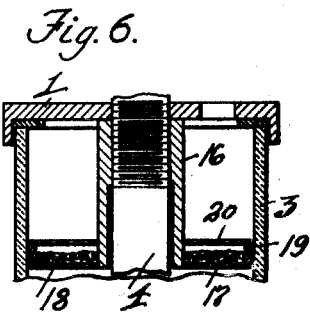
Figure 6 is a fragmentary sectional view of a sight feed oil cup showing in section a modified form of the filter unit.
Figure 4:
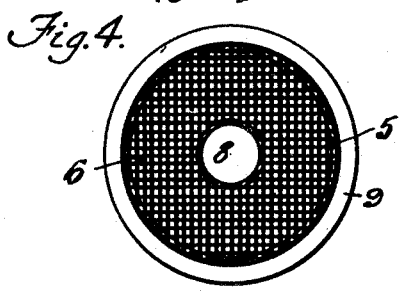
Figure 4 is a bottom view of the filter unit showing the screen which carries the filter element.
Figure 2:
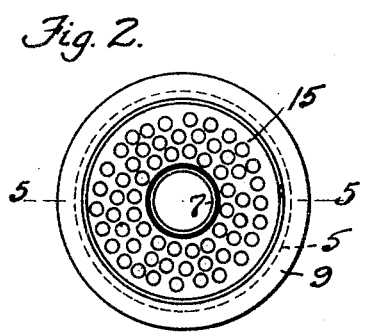
Figure 2 is a top plan view of the filter unit showing the upper protective perforated plate thereof.
Figure 5:
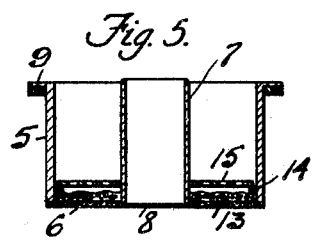
Figure 5 is a sectional view of the filter unit taken on line 5—5 of Figure 2.
Figure 3:
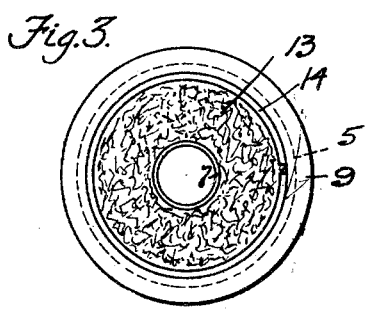
Figure 3 is a top plan view of the filter unit with the upper protective plate removed and showing the filter element.

In the modified form of the filter element shown in Figure 6, the tube 4 through which the needle valve extends is provided with an extended threaded portion at its upper end and over which another tubular member 16, internally screw threaded at its upper end, telescopes and has threaded engagement with the tube 4, as shown. The tube 16 has fixedly secured to the lower end thereof a screen member 17, which supports the filtering element 18 held to place by a flexible split ring 19 tensioned to engage the cup cylinder, and a protective perforated plate 20, which elements are all of the same form and having the same functions as the corresponding parts described in connection with the preferred form, the only distinction residing in the means for supporting the bottom screen, filtering element and protective plate thereon in assembled relation within the cup.

Figure 7:
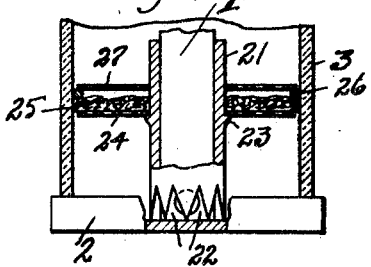
Figure 7 is a fragmentary sectional view of a sight feed oil cup showing in section still another form in which the filter unit may be made.

In the modified form shown in Figure 7, the parts of the filter unit are all of the same form and have the same functions as described in connection with the preferred structure with the exception of the means for supporting the parts in assembled relation within the cup. Such supporting means consists of a tubular member 21 telescoping over the tubular member 4 of the cup through which the needle valve extends, as in Figure 1, and which tubular supporting member is provided with recesses 22 at its lower end and resting upon the bottom of the cup, and through which recesses the oil may pass in any position of the tubular member 21 into the tubular member 4 within which the needle valve and discharge opening of the cup are located. The tubular member 21 is provided with a circumferential shoulder 23 upon which a perforated disk 24 is seated and which disk in turn supports the filtering element 25, which is held to place by a flexible split ring 26 tensioned to engage the cup cylinder, and upon which ring or upon the filtering element a protective perforated disk 27 is placed to guard the filtering element against damage or puncture in filling the cup, as explained above in connection with the preferred structure.

It will be obvious from the foregoing that by my improvement I have provided a filtering unit for oil cups which is simple in structure, cheap of manufacture, and effective for the purpose intended, and the parts of which are so combined and assembled that the unit may be easily disassembled for the purpose of cleaning the parts and for the replacement of the filtering element at intervals, which filtering element is the only part which will require replacement under normal conditions and the cost of which is negligible. It will also be apparent that the structure of the filtering unit is such that it may be handily applied to conventional forms of oil cups already in use.

The invention having been set forth what is claimed as new and useful is:

1. The combination with an oil feed cup of conventional design, comprising a circular flanged bottom portion provided with a perforated nipple, a centrally disposed perforated tube communicating with the perforation in the said nipple, a flanged cover plate secured to the central tubular portion, a cylindrical body portion interposed between the said flanged top cover plate and the flanged circular body portion, of a detachable oil filtering device comprising a circular metallic plate provided with a plurality of relatively small spaced perforations to permit the passage of oil therethrough, there being an enlarged central opening in the said plate adapting it for insertion on the interior of the cup concentrically with the said central tubular member, means for fixedly anchoring the said perforated plate within the body of the oil cup around the said central tubular member therein at a point intermediate the said circular top and bottom portions of the cup whereby to divide the said cup into separated chambers, a circular oil filtering element with an enlarged central perforation coterminous with the upper surface of the said perforated circular plate, a circular perforated metallic guard for the filtering element located above and coterminous with the upper surface of the filtering element, and means for spacing the perforated metallic guard from the filtering element comprising a detachable metallic ring extending peripherally around the upper surface of the filtering element and between the said element and the said metallic guard member.

2. The combination with an oil feed cup, having an oil receiving port in its upper end, of filtering means disposed within said cup and spaced above the bottom thereof, said filtering means comprising a holder, a screen carried by the holder, a filtering element supported by the said screen below the oil receiving port, a split ring engaging the holder and said filtering element for holding the latter against displacement, means for fixedly anchoring the said holder within the cup whereby to divide the latter into upper and lower chambers of predetermined capacity, and a second screen disposed above said filtering element and resting upon the said split ring below the said oil receiving port whereby to serve as a guard to prevent accidental rupture of the filtering element when the spout of an oil can is projected through the oil port in filling the said cup.

In testimony whereof I affix my signature.

HOWARD B. MORROW.